United States Patent [19]

Ichioka et al.

[11] 4,032,677

[45] June 28, 1977

[54] METHOD OF FORMING A COATING OF A RUBBER OR A SYNTHETIC RESIN HAVING AN EVEN THICKNESS ON THE EXTERNAL SURFACE OF A TUBULAR TEXTILE JACKET

[75] Inventors: Eiji Ichioka; Yurifumi Harada, both of Osaka, Japan

[73] Assignee: Ashimori Kogyo Kabushiki Kaisha, Osaka, Japan

[22] Filed: June 12, 1973

[21] Appl. No.: 369,290

[30] Foreign Application Priority Data

June 12, 1972 Japan ............................ 47-58446

[52] U.S. Cl. .................................. 427/358; 118/44; 118/419; 118/405; 118/DIG. 11; 118/DIG. 12; 427/374 A; 427/390 R; 427/412; 427/434 R
[51] Int. Cl.² ................................................ B05D 1/18
[58] Field of Search .............. 117/94; 118/44, 419, 118/405, DIG. 10, DIG. 11, DIG. 12; 427/434, 412, 358, 374, 390; 425/72, 403, 460, 326

[56] References Cited

UNITED STATES PATENTS

| 1,548,504 | 8/1925 | Becker | 118/DIG. 11 X |
|---|---|---|---|
| 2,338,266 | 1/1944 | Skoning | 118/DIG. 11 X |
| 2,418,974 | 4/1947 | Henry | 117/94 X |
| 2,602,959 | 7/1952 | Fenlin | 117/94 X |
| 2,961,323 | 11/1960 | Underwood et al. | 117/94 X |
| 3,201,827 | 8/1965 | Reynolds et al. | 425/403 |
| 3,434,860 | 3/1969 | Ferguson et al. | 117/94 X |
| 3,437,537 | 4/1969 | Takada | 117/94 X |
| 3,485,907 | 12/1969 | Quackenbush et al. | 117/94 X |

FOREIGN PATENTS OR APPLICATIONS

| 44-26751 | 11/1969 | Japan |
|---|---|---|
| 1,194,413 | 6/1970 | United Kingdom |
| 957,929 | 5/1964 | United Kingdom |

*Primary Examiner*—Michael R. Lusignan
*Assistant Examiner*—Stuart D. Frenkel
*Attorney, Agent, or Firm*—Birch, Stewart, Kolasch and Birch

[57] ABSTRACT

A method and apparatus of forming a coating of a rubber or a synthetic resin having an even thickness on the external surface of a tubular textile jacket made of fibers woven or knitted in a tubular form, which comprises passing the tubular textile jacket through a bath of a coating liquid such as a latex solution or rubber paste or a synthetic resin, and then curing the liquid coating attached to the external surface of the jacket. The present method is characterized in that an expanding member capable of inflating the tubular jacket to almost a circular shape in its cross-section is packed into the interior space of the tubular textile jacket and maintained in a definite position with respect to the coating liquid, thereby keeping the jacket almost circular in its cross-section at least for a distance from the point where the tubular textile jacket departs from the bath of coating liquid to a point where the coating liquid attached to the external surface of the tubular jacket no longer is fluid. A self-rotatable endless double-tubing and metal balls are advantageously used as the expanding member.

23 Claims, 18 Drawing Figures

METHOD OF FORMING A COATING OF A RUBBER OR A SYNTHETIC RESIN HAVING AN EVEN THICKNESS ON THE EXTERNAL SURFACE OF A TUBULAR TEXTILE JACKET

BACKGROUND OF THE INVENTION

This invention relates to an improved method for forming a uniform coating of rubber or a synthetic resin on the external surface of a tubular textile jacket. More particularly, this invention relates to the use of an extending member capable of inflating the tubular textile jacket circularly in its cross-section when packed thereinto and keeping the tubular jacket almost circular in its cross-section during the method for forming a coating of rubber or a synthetic resin on the external surface of the tubular textile jacket.

DESCRIPTION OF THE PRIOR ART

Heretofore known as a method for forming a coating of rubber or a synthetic resin on the external surface of a tubular textile jacket is a method disclosed in British Pat. No. 957,929 relating to improvements in the manufacture of fire hose. This British Pat. No. 957,929 discloses forming a coating on the external surface of a hose jacket and turning it inside out to form fire hose and discloses two methods for the first step of forming the coating on the external surface of a hose jacket. One method comprises passing a hose jacket in the flattened state through a bath of a latex or plastisol and then vulcanizing or gelling the coating on the external surface of the hose jacket, while the other method comprises inserting an air-tight air bag into the interior space of the hose jacket, supplying air to the air bag to inflate the hose jacket, passing the inflated jacket as such through a bath of a latex or plastisol and then vulcanizing or gelling the coating on the external surface of the hose jacket. However, these method are complex in operation and have a number of defects as will be detailed hereinafter. Thus, these methods are unsuitable for the manufacture of commercially valuable products having a uniform coating thereon.

In the former method wherein a hose jacket is passed in the flattened state through a bath of a latex or plastisol, a significant difference in flow state is found between the liquid attached to the flattened broad areas and that attached to the folded edge areas of the hose jacket; the quantity of liquid attached to the folded edge areas becomes smaller than that attached to the flattened broad areas, and as the result, the coating layer formed after solidification of the liquid becomes extremely thin in the folded edge areas. According to this method, therefore, a coating of an even thickness cannot be formed on the external surface of the hose jacket and two longitudinally extending lines where the coating is smaller in thickness will appear in the diametrically opposite positions of the resulting product. Such thinly coated areas in the hose jacket will tend to form pinholes when the hose jacket is subjected to further treatments including evagination, pressure tests, etc. for manufacturing the desired fire hose. Such pinholes prove to be a fatal defect to the fire hose. On the other hand, the external coating formed in the folded edge areas of the hose jacket is comparatively thin and most damageable by external force or friction. Thus, there is a fear of injury or damage in such areas during the subsequent treatment for manufacturing the fire hose. The former method thus fails to produce a coating of an even thickness and rather serves to minimize the merit achieved by forming a coating on the external surface of the hose jacket.

Figure 2:
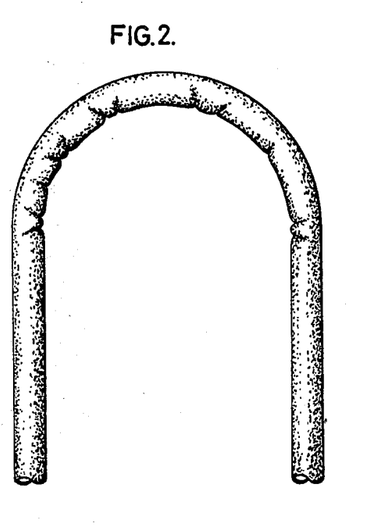
FIG. 2 is a side view of an inflated tubular textile jacket in the state of being forcedly curved with a small radius of curvature.

In the latter method wherein the formation of such an external coating is conducted while the hose jacket is inflated by the aid of an air bag packed thereinto, no problem arises in the formation of an external coating having an even thickness as in the former method described above. This is ascribable to the reason that the flow state of the liquid attached to the external surface of the hose jacket is even all over the external surface since the hose jacket is inflated and kept circular in its cross-sectional view. However, this method also has several serious drawbacks. Firstly, it requires a complicated operation which makes it difficult to produce fire hose economically. In the practice of this method, some additional operations, including the insertion of an air bag into the interior of the jacket, elevation of the air pressure in the air bag and removal of the air bag from the jacket after the formation of the external coating, are required, thus making the procedure extremely complicated. Secondly, the hose jacket inflated according to this method by the aid of a pressurized air bag is still and consequently is hardly curved. If it is desired to curve the inflated hose jacket, the minimum radius of curvature will be at least 50 cm. If the inflated hose jacket is forcedly curved with a smaller radius of curvature, smooth curving will no longer be attained and the hose jacket will be curved with an angle in several positions (FIG. 2). This drawback obviously incurs unnecessary expenses for additional apparatus. If the running course of the inflated hose jacket is changed during the step of forming a coating on the external surface of the jacket, rolls having a diameter of at least one meter will be needed to warrant smooth curving of the inflated jacket, thus resulting in considerable enlargement of the apparatus. In addition, a considerable space is required for the apparatus to keep a smooth running of the inflated jacket during the coating and solidifying treatments. Thirdly, a troublesome problem arises in maintenance of the air bag inflated by the internal air pressure. Although perfect sealing of the air bag packed into the jacket is necessary, it is quite difficult from the technical viewpoint to prevent leakage of air perfectly from the bag. Even a slight leakage of air creates a shrinkage of the inflated hose jacket and finally results in the formation of a coating having an uneven thickness. In addition, leaked air is released through voids in the reticulate structure of the fibrous jacket whereby the coating already formed is broken to cause the formation of pinholes or cracks on evagination of the hose jacket. Thus, the latter method is also commercially unattractive in every aspect of space, apparatus and expense and has many complexities and difficulties in technical operations. For instance, even a minor technical error as represented by the above mentioned leakage of air results finally in the production of unmendable products.

Fundamentally, said British Pat. No. 957,929 which teaches the formation of a coating on the external surface of a hose jacket and the subsequent evagination of the coated hose jacket may be evaluated as an excellent invention in the field of manufacturing fire hose. However, this prior art involves several serious defects in the step of forming a coating on the external surface of the hose jacket. To overcome these defects in said prior art, therefore, there is a large demand for development of an improved method for uniformly coating the external surface of a tubular textile jacket with a latex or a plastisol.

BRIEF SUMMARY OF THE INVENTION

Accordingly, it is an object of this invention to provide a method for forming a coating of an even thickness on the external surface of a tubular textile jacket.

It is another object of this invention to provide an economical method for coating the external surface of a tubular textile jacket evenly with rubber or a synthetic resin in a simple manner without the necessity of using a large apparatus and a great amount of space.

It is still another object of this invention to provide a tubular textile jacket having on its external surface a coating of rubber or a synthetic resin having an even thickness.

It is a further object of this invention to provide an expanding member capable of keeping the tubular textile jacket almost circular in its cross-section during the coating treatment, thereby making it possible to form a coating of an even thickness on the external surface of the jacket.

These and other objects, features and advantages of this invention will become apparent from the detailed description given hereinafter; it should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the drawings, FIG. 1-a is a cross-sectional view of a flattened tubular textile jacket having a non-uniform coating on its external surface;

FIG. 1-b is a cross-sectional view of the inflated tubular textile jacket of FIG. 1-a;

FIG. 5-a is a sectional view (longitudinal) of a self-rotatable endless double-tubing, FIG. 5-b is a cross-sectional view of the self-rotatable endless double-tubing of FIG. 5-a cut along the line A–A';

FIG. 6-a is a sectional view (longitudinal) of another type of self-rotatable endless double-tubing having an additional outer tube;

FIG. 6-b is a cross-sectional view of the self-rotatable endless double-tubing of FIG. 6-a cut along the line B–B';

DETAILED DESCRIPTION OF THE INVENTION

In accordance with this invention, there is provided a method for forming a coating of rubber or a synthetic resin having an even thickness on the external surface of a tubular textile jacket made of fiber woven or knitted in a tubular form, which comprises passing the tubular textile jacket through a bath of a coating liquid such as latex, solution or paste of rubber or a synthetic resin, and then curing the liquid coated on the external surface of the tubular textile jacket, characterized in that an expanding member capable of inflating the tubular textile jacket to an almost circular form in its cross-sectional view is inserted into the interior space of the tubular jacket and is maintained in a definite position with respect to the coating liquid, thereby keeping the tubular textile jacket almost circular in its cross-section at least for a distance from the position where the tubular jacket departs from the bath of coating liquid to the position where the liquid coated on the external surface of the tubular textile jacket is no longer fluid.

It has now been found that insertion of a specific expanding member which is self-rotatable by external friction into the interior space of a tubular textile jacket serves to inflate the jacket to a circular form in its cross-section and maintains itself in a definite position automatically, regardless of the running of the jacket, because of the self-rotatable property. This invention has been accomplished on the basis of the above finding.

According to the method of this invention using the specifically described expanding member, a tubular textile jacket running in a bath of a coating liquid is kept almost circular in its cross-sectional view and is continuously kept in this state for a certain distance after being drawn from the bath, whereby the flow state of the liquid attached to the external surface of the tubular textile jacket is maintained identical all over the external surface. In contrast to the prior art method where the thickness of the coating is reduced in the folded edge areas of a flattened jacket, the method of this invention permits the formation of a coating of an even thickness all over the external surface of a tubular textile jacket. When the liquid coated on the external surface of a tubular textile jacket has been solidified to a certain degree so as to lose its fluidity, the tubular textile jacket may be flattened. If the tubular textile jacket is flattened at that stage, the flow state of the liquid will be identical in both the flattened broad areas and the folded edge areas and the thickness of the coating will no longer be changed since the liquid on the external surface of the tubular textile jacket has lost its fluidity. This results in the formation of a coating of an even thickness all over the external surface of the jacket.

In general, the expanding member comprises a self-rotatable endless double-tubing, metal balls or glass or ceramic balls, but the use of said self-rotatable endless double-tubing is particularly preferred. The self-rotatable endless double-tubing is quite unique in this art and can generally be manufactured by turning a tubing made of natural or synthetic rubber, such as butyl rubber, inside out from its one end to the half of its full length and bonding the evaginated end to the other end of the tubing not yet turned inside out. Thus, the external surface of one end of the tubing is bonded after evagination to the internal surface of the other end of the tubing to form a double-tubing which, in longitudinal section, shows a caterpillar or endless belt. This double tubing may thus be viewed as a three dimensional tubular endless belt and is easily self-rotatable by friction when an external force is added onto the external surface of the double-tubing in its longitudinal direction. In actual use, the endless double-tubing may be inflated to an almost circular form in its cross-section and, simultaneously, moderate friction may be created between the internal surface of the tubular textile jacket and the external surface of the double-tubing inserted thereinto for enabling its self-rotation. To avoid mechanical damage such as abrasion of the double-tubing by friction, an adequate surface treatment may be applied to the double-tubing. A preferable surface treatment includes coating with cloth or other anti-abrasion layers. The size of the endless double-tubing, i.e., the diameter and length of the double-tubing, can be adequately determined according to various conditions, such as the type and inner diameter of the tubular textile jacket to be coated, the running speed of the jacket and the solidifying condition. In case metal balls or the like balls are used as the expanding member, the balls will be truly spherical in shape for attaining a smooth rotation in the tubular textile jacket. The use of stainless steel balls or glass balls is particularly suited for this purpose because of their durability for repeated use, but ordinary steel balls may be economically employed with good results. In general, the balls should have a large apparent specific gravity and high hardness. Thus, the use of metal balls meeting such requirements is generally preferable. The size of the balls may also be determined adequately according to the type and the inner diameter of the tubular textile jacket as well as the running speed of the jacket.

In case the endless double-tubing is inserted into a tubular textile jacket being drawn upwardly from a coating liquid bath in accordance with a preferred embodiment of this invention, the self-rotating endless double-tubing can be kept at a definite position with respect to the coating liquid bath by suitably controlling either the speed of the upwardly running tubular textile jacket or the weight (i.e., the downwardly acting gravitational force) of the double-tubing by charging it fully or partly with a fluid substance. The position of the double-tubing with respect to the coating liquid bath can be maintained more definitely by using a specific mechanical means such as a holder. When the position of the double-tubing is fixed by means of such a holder, the double-tubing may be used in another embodiment of this invention where the tubular jacket is drawn downwardly or horizontally from the coating liquid bath.

The externally coated tubular textile jacket is heated, while being kept in an inflated condition, to solidify the coating liquid on the external surface thereof. The coating treatment and the heating treatment are usually carried out continuously by conveying the externally coated jacket through a heating zone where the jacket is heated for a sufficient period of time at a temperature sufficient to solidify the coating liquid. A hot air blast or a heating means utilizing infra-red rays is preferably used as the heat source. Any solvent contained in the coating liquid is evaporated by the heating step and vulcanization or curing of the rubber or resin takes place if a vulcanizing agent or polymerization accelerator is contained in the coating liquid.

In the practice of this invention, a tubular textile jacket may be directly passed through a coating liquid. In case the jacket is made of a relatively loose texture and the viscosity of the coating liquid is low, the coating liquid will penetrate through the loose retiform texture to the internal surface of the jacket and cause defects in the final product. In such a case, therefore, the tubular textile jacket is preferably passed, prior to the coating treatment, through a clogging liquid to clog the pervious loose reticulate structure therewith. The treatment for applying a clogging liquid to the jacket is almost the same as in the case of applying a coating liquid to the jacket. The clogging liquid to be used includes a latex, solution or paste of rubber or a synthetic resin having a viscosity of 5000–20000 cp. It is preferable to use the same type of clogging liquid as the coating liquid employed in the particular process.

In this invention, the tubular textile jacket may be manufactured from any of the fibrous materials woven or knitted in a tubular form. Preferred fibrous materials include natural and synthetic organic fibers and inorganic fibers such as cotton, linen, glass, regenerated cellulose, and polyamide and polyester resins.

The coating liquid is generally in the form of a viscous liquid such as a latex, solution or paste of natural or synthetic rubber or a synthetic resin and forms, when heated on the tubular textile jacket, a water-insoluble coating. A latex of natural or synthetic rubber is particularly preferred in this invention. The coating liquid may contain a vulcanizing agent, polymerization accelerator and other additives such as plasticizers, dyes and the like that are usually employed in coating compositions. If necessary, the base polymer may be blended with chloroprene to improve the weather resistance and ozone resistance of the coating.

This invention will now be described in more detail with reference to the accompanying drawings.

Figure 1A:
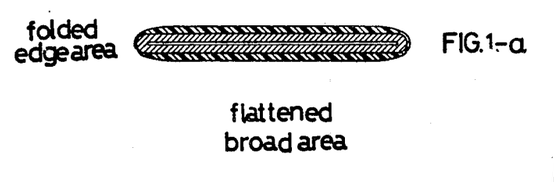
Figure 1B:
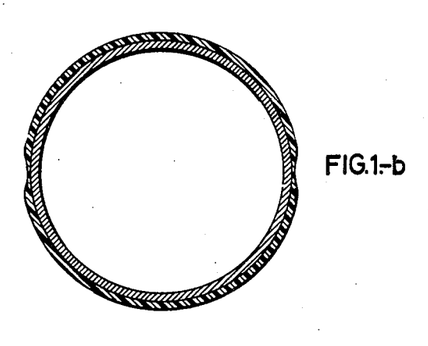

FIGS. 1-a, 1-b and 2 show the defects in the prior art methods when compared with the method of the present invention. FIG. 1-a shows a cross sectional view of a flattened tubular textile jacket coated according to a well known coating treatment, wherein a larger amount of coating liquid is disposed in the flattened areas than in the folded edge areas. FIG. 1-b shows, in cross section, the unevenly coated tubular textile jacket of FIG. 1-a in an inflated condition wherein the thickness of the coating is reduced in the edge areas of the jacket.

FIG. 2 shows a side view of an inflated tubular textile jacket with a small radius of curvature wherein a smooth curvature is not obtainable.

Figure 3:
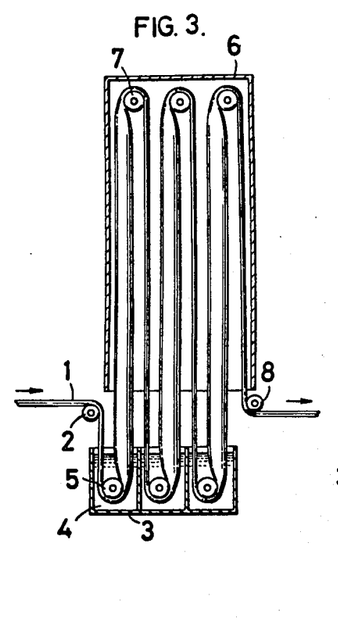
FIG. 3 is a diagram showing a preferred example of the apparatus useful in the practice of this invention.

FIG. 3 shows an embodiment of the present invention wherein a tubular jacket 1 maintained in a flattened condition is conveyed via a guide roll 2 into a coating liquid bath 4 placed in a container 3. The coating liquid can be any synthetic resinous material which is capable of being solidified by drying or gelation to form a coating on the external surface of the jacket. The downwardly running tubular textile jacket is then turned upwardly by the lower roll 5 rotatably disposed in the coating liquid. An expanding member is inserted into the inner space of the upwardly running tubular textile jacket so as to inflate it. The expanding member is maintained in a definite position by any suitable means. The lower end of the expanding member may be maintained at a height equal to the level of the coating liquid or maybe extended beyond the level of said liquid. Accordingly, the upward running tubular textile jacket is inflated to almost a circular form in its cross-section before it leaves the coating liquid bath. The tubular textile jacket 1 is conveyed upwardly while in the inflated condition and enters into a heating oven 6 where the tubular jacket is heated by hot air, an infra-red ray lamp or the like. The coating solution is dried to a solid when the solution is in the form of a latex or a solution but is gelled to a solid when the solution is in the form of a paste. The upper end of the expanding member extends at least to a position where the coating liquid attached to the external surface of the jacket loses its fluidity or is solidified to a certain degree. When the upwardly conveyed tubular textile jacket reaches a point higher than the upper end of the expanding member, the coating liquid on the external surface of the jacket loses its fluidity and the resulting coating layer will no longer change in its thickness. When the upwardly conveyed tubular textile jacket exceeds the upper end of the expanding member, inflation of the tubular jacket is no longer maintained and it is gradually flattened with attendant solidification of the coating. Then, the upwardly conveyed tubular textile jacket 1 is again turned in the downward direction by the upper roll 7 rotatably disposed in the upper position of the heating oven 6. The tubular textile jacket 1 is maintained entirely in a flattened condition when turned by the upper roll 7 or the lower roll 5. Consequently, the diameter of each roll should not be too large and, in fact, the jacket can be more readily turned by the action of rolls with a small diameter. The jacket is kept in a flattened condition while it is conveyed downwardly into the coating liquid. The upper roll 7 may be provided in the heating oven 6 as shown in FIG. 3 or may be located above the ceiling of the heating oven 6. The latter mode is preferable. When the upper roll is disposed in the heating oven 6, the coating on the external surface of the jacket is somewhat softened by the heated roll which tends to damage the jacket whereas when the roll is not located in the oven, the coating is somewhat cooled by the roll and is not affected by the heat. If necessary, the externally coated jacket is again dipped into the coating liquid and the treatment may be repeated until a coating layer of the desired thickness is obtained on the external surface of the jacket. FIG. 3 shows the coating treatment in three cycles but the number of cycles is not limited thereto. In general, the number of cycles in the coating treatment depends on the viscosity and solid concentration of the coating liquid, the desired thickness of coating and similar factors. After the formation of a coating having a desired thickness, the tubular textile jacket is removed from the oven via a guide roll 8.

Figure 4:
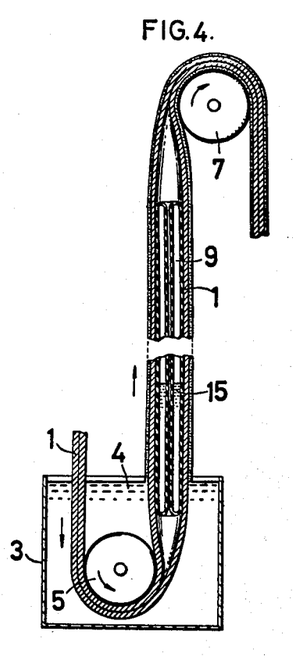
FIG. 4 is a sectional view (longitudinal) of one complete unit of the apparatus of FIG. 3.

FIG. 4 shows one complete unit of the apparatus of FIG. 3 using a self-rotatable endless double-tubing 9 as the expanding member. In this example, the endless double-tubing is charged with a fluid substance 15 which may be a liquid, a powdery or granular substance, a mixture of these substances or the like. Glycerol and soap water are particularly preferred for this purpose because of their additional lubricating action. Such fluid substances are not charged fully into the double-tubing 9 and are generally used in such an amount that when the external tube of the endless double-tubing 9 is supported, the double-tubing can spontaneously be turned inside out by virtue of its own weight. The remaining space of the endless double-tubing, partly charged with the fluid substance, is filled by a gaseous substance, for example, air.

In practicing the present invention using the self-rotatable endless double-tubing as the expanding member, the endless double-tubing 9 is inserted into the inner space of the ascending tubular textile jacket 1 whereby the external tube of the double-tubing in contact with the inner surface of the jacket is moved upwardly with the ascending movement of the jacket. On the other hand, however, a descending gravity force due to the weight of the double-tubing charged with the fluid substance 15 acts upon the double-tubing 9 itself. Thus, the external tube of the double-tubing which is in intimate contact with the inner surface of the tubular textile jacket does not descend because of the friction. On the other hand, the internal tube of the double-tubing descends freely due to gravity whereby the internal tube is evaginated at the lower end of the double-tubing to form the external tube while the ascending external tube is reversed in its running direction at the upper end of the double-tubing and pulled inside to form the internal tube. As the tubular textile jacket 1 ascends, the endless double-tubing 9 will repeat its rotation at a definite position to the coating liquid 4, while alternating the external tube continuously with the internal tube. Since the rotation of the endless double-tubing is caused by its own gravitational force, in order to obtain maximum effectiveness it is desirable to draw up the tubular textile jacket having the double-tubing inserted therein, in the perpendicular direction from the bath.

Figure 5A:
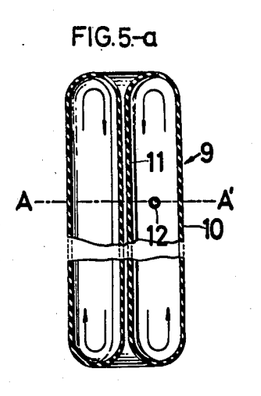
Figure 5B:
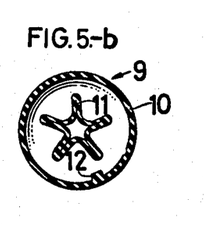

In FIGS. 5-a and 5-b, a self-rotatable endless double-tubing 9 consists of an external tube 10 and an internal tube 11, each made of the same flexible material, such as a rubber material or a synthetic resin. The external and internal tubes coalesce at their upper and lower ends to form an endless double-tubing. Since the external tube 10 and the internal tube 11 each have an equal diameter, the internal tube exists in the state of being continuously and forcedly inserted into the external tube. When a pressurizing fluid substance is charged into the endless double-tubing 9, the external tube is inflated to a circular form in its cross section while the internal tube 11 is squeezed out of shape. Since the external and internal tubes 10 and 11 have an equal diameter and are made of a flexible material, self-rotation of the double-tubing caused by its own gravitational force and friction between the external tube and the tubular textile jacket alternates the external tube with the internal tube. In this case, the internal tube 11 descending due to its gravitational force is turned inside out at the lower end to form the external tube 10 while the external tube 10 ascending with the tubular textile jacket by friction is reversed in its running direction at the upper end and pulled inside to form the internal tube 11. Such self-rotation of the double-tubing 9 is continuous and looks, in its sectional view, as if it were the motion of an endless belt or caterpillar. The double-tubing 9 is provided on its internal surface with a fluid charging means 12, e.g., a rubber tip as seen in a tennis ball or an air valve as seen in inner tubes, through which a pressurizing fluid substance and/or air is injected into the internal space of the double-tubing.

Figure 6A:
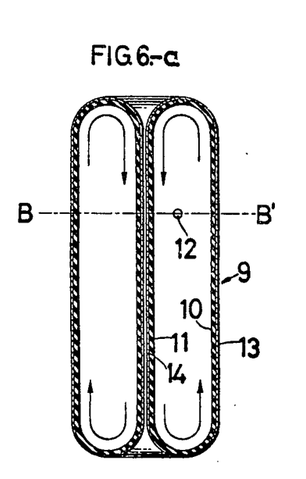
Figure 6B:
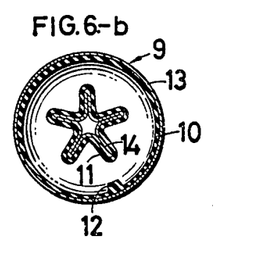

FIGS. 6-a and 6-b show in longitudinal and cross sectional views another type of endless double-tubing, the external tube 10 and the internal tube 11 of the double-tubing 9 having a navel 12 on the internal surface thereof. The external tube 10 and the internal tube 11 are further coated with an external cloth tube 13 and an internal cloth tube 14, respectively. The endless double-tubing of this type can thus be considered the endless double-tubing 9 of FIG. 5 coated further with an endless thin soft cloth tube. These cloth tubes 13 and 14 have a diameter somewhat larger than that of the tubes 10 and 11 and are brought into intimate contact with said tubes when a pressurizing fluid substance and/or air is charged into the double-tubing. The external cloth tube 13 and the internal cloth tube 14 may or may not be bonded to the external tube 10 and the internal tube 11 of the double-tubing 9. A coated endless double-tubing element of this type is excellent in abrasion resistance and durability and tolerates higher pressure as compared with the endless double-tubing of FIG. 5.

Figure 7:
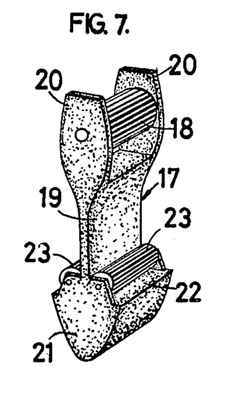
FIG. 7 is perspective view of a holder.

In FIG. 7, a holder 17 comprises a base plate 19, two side plates 20 extending upwardly from both sides of the base plate 19 and fixed thereto, a roll 18 rotatably mounted between both side plates 20, a nose 21 extending in the downward direction and having the shape of a wedge and two rolls 23 rotatably mounted in a direction parallel to the roll 18, parallel to the flat base of the nose 21 and adjacent to both surfaces of the base plate 19. The roll 18 may or may not be rotatable when it is made of or coated with a frictionless substance such as polytetrafluoroethylene. The holder serves to keep in a definite position an expanding member, especially the self-rotatable endless double-tubing to be inserted into the tubular textile jacket. In practical use, the holder is set, irrespective of its top-and-bottom structure, in such a manner that the nose of the holder is towards the running tubular textile jacket and is initially brought into contact therewith.

Figure 8:
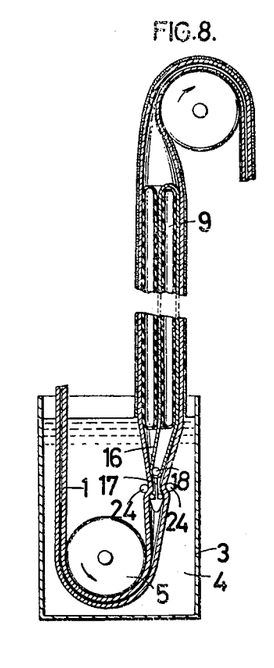
FIGS. 8–10 are cross-sectional views of various modified types of the apparatus of FIG. 4 using the holder of FIG. 7.

FIG. 8 shows a modified apparatus using the holder 17 jointly with the endless double-tubing 9 disposed inside the tubular textile jacket. A tape is put around the roll 18 and around the external and internal tubes of the double-tubing and is tied at the terminal ends to form an endless tape. The holder 17 itself is supported externally by means of a pair of support rolls 24 to keep the endless double-tubing in a definite position. When the tubular textile jacket 1 which has been dipped into a coating liquid 4 placed in a container 3 is turned by means of a lower roll 5 and drawn upwardly, the ascending force acts on the external tube of the double-tubing 9, on tape 16 in intimate contact with the ascending jacket and also on the holder 17 due to the upward acting tension of tape 16. However, the holder 17 per se is supported by a pair of the support rolls 24, which inhibits the holder from ascending. Accordingly, the ascending force acting on the tape 16 sandwiched between the ascending jacket 1 and the external tube of the double-tubing 9 is transmitted through the roll 18 to the tape 16 adjacent to the internal tube of the double-tubing 9 to allow it to descend. In this case, the internal tube of the double-tubing 9 is in intimate contact with the tape 16 passing therethrough under pressure caused by a pressurizing fluid substance charged into the double-tubing 9. Thus, the descending force of the tape 16 is easily transmitted to the internal tube to allow it to descend. On the other hand, the external tube of the double-tubing 9 and the tape 16 sandwiched in between the external tube and the tubular textile jacket 1 are allowed to ascend with the ascending jacket 1, resulting in the smooth repeated self-rotation of the endless double-tubing and the endless tape in a definite position. It is possible to allow the tubular textile jacket to ascend freely by rotating the rolls 23 and support rolls 24. In this embodiment, various cordages such as a belt, rope or the like, may be substituted for said tape 16 to obtain equivalent effects.

Figure 9:
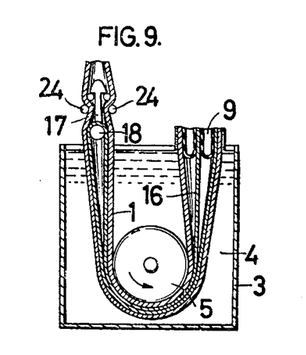

In FIG. 9, which shows a variant of the apparatus of FIG. 8, the holder 17 is provided with a roll 18 and a pair of the support rolls 24, the latter being located outside the container 3 containing the coating liquid 4. In the case where a rubber latex is used as the coating liquid 4, such an arrangement of the holder 17 is particularly preferred to remove any fear of local coagulation of the rubber latex which may be caused by the pressure contact of the tubular textile jacket 1 with the support rolls 24 in the coating liquid 4. In such an arrangement, however, a somewhat stronger force is required for running the tubular textile jacket 1 since the tape 16 set around the double-tubing 9 and the roll 18 runs in the reverse direction to the rotation of the lower roll 5 on which the tubular textile jacket 1 is running. Thus the textile jacket 1 is brought into contact under strong pressure with the tape 16 running in the reverse direction.

Figure 10:
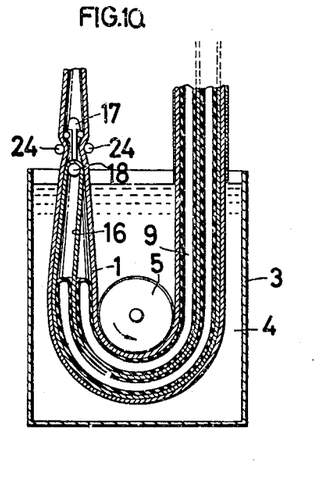

FIG. 10 shows another embodiment of the apparatus of FIG. 8, wherein the double-tubing 9 located in FIG. 9 in the right-hand upwardly running tubular textile jacket 1 extends beyond the lower roll 5 to a left-hand position just below the holder 17 with the support rolls 24 being located outside of the container 3 containing the coating liquid 4. In this embodiment, the tape 16 which is running in the reverse direction to jacket 1 is free from intimate contact with said jacket running in its normal direction. However, a lower roll having a relatively large diameter is needed to effect smooth curving of the inflated tubular textile jacket 1.

Figure 11:
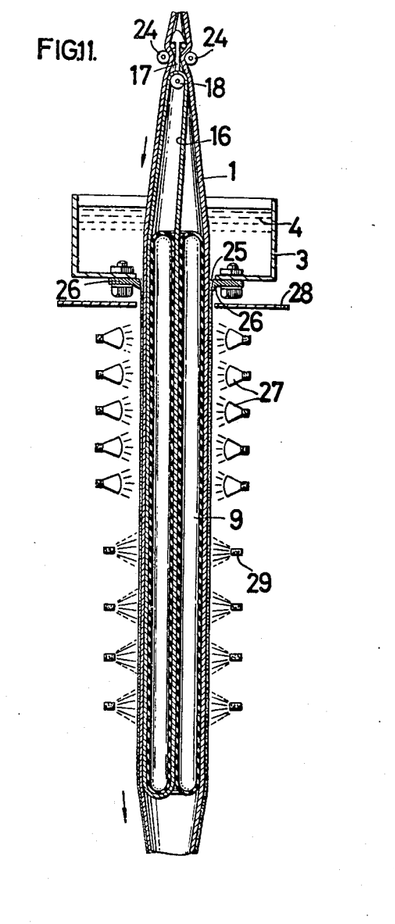
FIG. 11 is a cross-sectional view (longitudinal) of a downwardly arranged apparatus using the self-rotatable endless double-tubing of FIG. 5-a or 5-b and the holder of FIG. 7.

FIG. 11 shows another embodiment of the process and apparatus of the present invention wherein the apparatus is arranged vertically using the endless double-tubing and the holder. The apparatus of this type is particularly suitable when using polyvinyl chloride plastisol as the coating liquid. A downwardly running tubular textile jacket 1 enters into a tank 3 filled with a plastisol 4 and descends through a hole 25 provided at the bottom of the tank 3. A ring 26 made of rubber or a synthetic resin is mounted on the hole 25 to control the quantity of plastisol 4 applied to the external surface of the descending jacket 1. The ring 26 also functions to prevent the leakage of a large quantity of plastisol 4 from the tank 3 through the hole 25. The location of the upper end of the double-tubing 9 is at least as high as the position of the ring 26 thereby making it possible to inflate the tubular textile jacket 1 to an almost circular form in its cross section on passing through the ring 26. A definite clearance is maintained at all times between the ring 26 and the periphery of the jacket 1 to make sure a definite amount of paste is attached to the external surface of the jacket. The descending jacket 1 is then heated externally by radiation from infra-red ray lamps 27 disposed in juxtapose position on both sides along the travelling course of the jacket, whereby the plastisol attached to the external surface of the jacket 1 is gelled. Infra-red ray heaters and hot air blasts can also be employed as a heat source in place of said infra-red ray lamps. A shielding plate 28 is provided between the tank 3 and the lamps 27 to protect the tank 3 from heat generated from lamps 27. If such shielding plates are not utilized, the tank 3 will be heated by lamps 27 causing gelation of the plastisol 4 in said tank. The coated tubular textile jacket 1 is heated sufficiently to completely gel the plastisol 4 attached to the external surface of the jacket and is then cooled by external cold water sprinklers 29 arranged on both sides along the travelling course of the jacket. The external surface of the tubular textile jacket 1 to form a tough coating but also cools the endless double-tubing 9 heated by the infra-red ray lamps 27 through the walls of the jacket 1. This prevents thermal deterioration of the double-tubing and the excessive elevation of the inner pressure of the fluid substance confined in the double-tubing. In the case where the external tube of the endless double-tubing 9 is not sufficiently cooled at its upper end, after one cycle of rotation, it will be brought, while hot, into contact again as the external tube with the tubular textile jacket 1 at the upper end, where the residual heat will be transmitted to the plastisol 4 in tank 3 through the jacket 1 causing undesirable gelation or variation in the viscosity of the plastisol 4. In addition to sprinkling the jacket with cold water as shown in FIG. 11, introduction of the heated jacket into a deep water bath may also be effective as a means for cooling the jacket.

Figure 12:
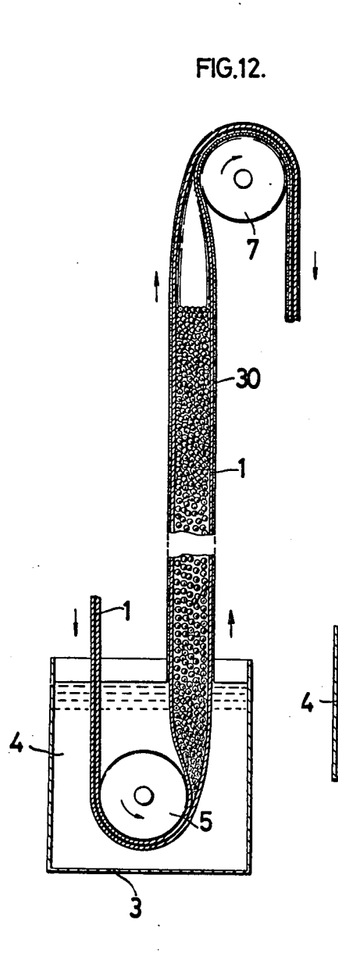
FIG. 12 is a cross-sectional view (longitudinal) of the apparatus of FIG. 4 using metal balls as expanding member.

According to another embodiment of the method and apparatus of the present invention, a number of metal, glass, or ceramic balls are used as the expanding member to be inserted into the upwardly running tubular textile jacket for inflating it to an almost circular form in its cross section. FIG. 12 shows an example of this embodiment, wherein a tubular textile jacket 1 in a flattened condition enters into a tank 3 filled with a coating liquid 4. The descending direction of the jacket is reversed to an ascending direction by means of a lower roll 5. A plurality of steel balls 30 are packed into the upwardly running jacket 1 to inflate it to almost a circular shape in its cross section. On drawing the externally coated jacket 1 upwardly, an ascending force acts on the steel balls 30 in intimate contact with the ascending jacket. However, the descending force produced by the weight of the steel balls 30 acts thereon at the same time to inhibit the free elevation of the steel balls by the ascending jacket. Accordingly, the bulk of the steel balls 30 are substantially maintained in a definite position although the positions of individual steel balls may vary as a result of the repeated local ascending and falling movements of the steel balls. As the effect of maintaining the steel balls in a definite position is caused by their own gravitational force to draw up the jacket packed with the steel balls from the coating bath in substantially a perpendicular direction. The externally coated tubular textile jacket is then passed, while in an inflated condition, through a heating zone to solidity the coating liquid on the external surface of the jacket. To satisfactorily secure inflation of the jacket during the drying or heating treatment, the upper end of the column of steel balls extends beyond the upper end of the heating zone. When the ascending jacket exceeds the upper end of the column of steel balls, inflation of the jacket is no longer maintained and thus the jacket is gradually flattened. The flattened tubular textile jacket having a solidified coating on its external surface is again turned in the downward direction by an upper roll 7 and, if necessary, is subjected repeatedly to the coating and drying treatments.

In this method, granules and/or particulate materials having a large apparent specific gravity may be packed into the tubular textile jacket as expanding members. However, the use of particles of too small a size or liquid substances should be avoided since these substances enter into the reticulated structure of the textile jacket and are conveyed therewith. This produces soiling of the jacket and decreases the amount of packed substance. A granular substance having such a size that it cannot enter into the space of the reticulated structure of the jacket is adeqaute as the expanding member. When such granular substance in intimate contact with the tubular textile jacket is elevated as the jacket ascends, the substance should readily drop into the space formed by the elevation of a part of the substance. In addition, a column of such granular substance should convert, at its bottom portion, the overhead gravitational force into a radially expanding force serving for inflating the jacket. In view of such requirements, the substance is desirable spherical in shape and is made of a non-deformable material. Spherical balls made of metals, such as steel, and glass or ceramic balls are particularly suitable as the expanding member because of their large apparent specific gravity and high hardness. However, according to this embodiment, the gravitational force of the granular substances such as steel balls cannot entirely be converted into a force for inflating the tubular textile jacket because the steel balls are not fluid but rather are solid, and thus friction is produced among the individual balls and between the balls and the internal surface of the jacket. In practicing the method of the present invention over a long period of time, the steel balls gradually fail to drop to their original positions and thus the column of steel balls is slowly shifted to a higher position, resulting in gradual change in the shape of the cross section of the jacket from a circle to an ellipse. One or more pairs of press rolls can be effectively used for preventing such phenomenon and to maintain the jacket in almost a circular form in its cross section.

Figures 13, 14, 15:
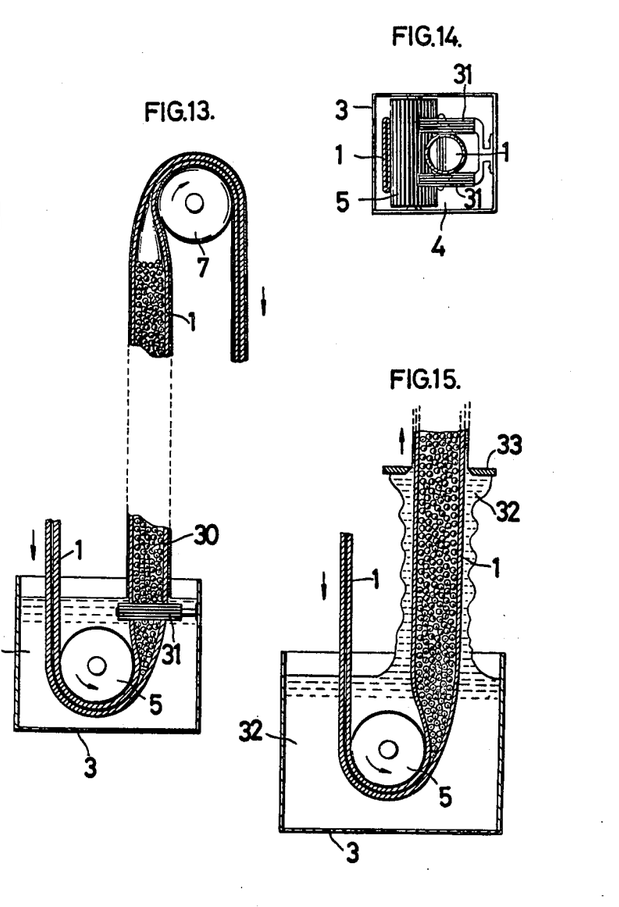
FIG. 13 is a cross-sectional view (longitudinal) of the apparatus of FIG. 12 provided with a pair of press rolls.
FIG. 14 is a front view of the apparatus of FIG. 13.
FIG. 15 is a partial cross-sectional view (longitudinal) of an apparatus for applying a clogging liquid to the tubular textile jacket.

In FIGS. 13 and 14, a pair of two press rolls 31 is mounted to tank 3 filled with the coating liquid 4 so as to press, at a position slightly lower than the level of the liquid 4, the half-flattened portion of the tubular textile jacket 1 reversed in its running direction by means of lower roll 5. The cross sectional area of the tubular textile jacket 1 is thus enlarged at a position where it leaves the lower roll 5 whereby the dropping of the steel balls 30 is facilitated to keep the jacket circular in its cross section.

In a further variant of the method and apparatus of the present invention, the embodiment using the self-rotating endless double-tubing as shown in FIGS. 3, 4 and 6-11 may be employed in combination with the embodiment using metal balls or the like as shown in FIG. 12. In this case, the method of this invention is preferably carried out by using the endless double-tubing for one-half of the method and the metal balls or like granular material in the second half of the method. More precisely, when the coating operation is carried out repeatedly by dipping the tubular textile jacket several times, for example, 6-8 times, the initial 3-4 operations can be carried out by using the endless double-tubing and the remaining 3-4 operations can be carried out by using the metal balls. Adoption of such mixed embodiments is recommendable because of easiness of operation and for economical reasons.

FIG. 15 shows an apparatus for the preliminary treatment of a tubular textile jacket with a clogging liquid. Thus a tubular textile jacket 1 is introduced, while in a flattened condition, into a tank 3 filled with a clogging liquid 32 and is reversed from a descending to an ascending position by means of a lower roll 5 rotatably disposed in the liquid 32. Adequate balls such as steel balls 30 are charged as expanding members into the inner space of the ascending jacket 1 to maintain it circular in its cross section. A self-rotatable endless double-tubing may be used as the expanding member in place of such steel balls. As the clogging liquid 32 is higher in viscosity than the coating liquid, an extremely large amount of the clogging liquid is attached onto the external surface of the jacket as shown in FIG. 15 when the jacket is drawn from the clogging liquid. Accordingly, the jacket 1 is passed through a ring 33 having a definite peripheral clearance to scrape off an excess amount of the viscous liquid 32 from the external surface of the jacket 1. The ring 33 is made of a relatively stiff material and preferably has an inner diameter almost equal to or somewhat larger than the outer diameter of the jacket 1. On passing the jacket 1 through the ring 33, a part of the liquid 32 is pushed into voids of the loose texture to clog them. If the jacket thus treated is successively passed through a coating liquid, penetration of the coating liquid through the retiform texture of the jacket will be prevented. As the clogging liquid is poor in fluidity, it may be applied to the jacket in a flattened condition. However, it is difficult to scrape off an excess amount of the clogging liquid evenly from the whole surface of the jacket unless it is inflated to a circular form in cross section. As the viscosity of the clogging liquid is extremely high, a flexible soft material such as sponge cannot be utilized as stock material for shaping the ring 33. Thus, the ring is desirably as stiff as possible and can be made from metals, hard rubber, hard plastics, and the like, unlike the endless double-tubing which requires good flexibility.

The method of the present invention is particularly useful for forming a uniform coating on the external surface of a tubular textile jacket in the manufacture of a hose for high liquid pressure applications, for example, a fire hose, by forming a coating of rubber or a synthetic resin on the external surface of a tubular textile jacket and turning it inside out. Furthermore, the method of the present invention can advantageously be employed to apply an external coating to a hose for improving its durability.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a method of forming a coating having a uniform thickness on the external surface of a tubular jacket wherein the tubular jacket is conveyed through a coating liquid bath and drying zone and maintained in a substantially circular cross-sectional shape at least for a distance from the point where the coating is applied to the tubular jacket to a point where the coating attached to the external surface of the jacket solidifies, the improvement which comprises inserting into the inner space of the tubular jacket a flexible, self-rotatable, endless, double tubing expanding member, said expanding member continually turning on itself, inside out and outside in, as a result of being in frictional contact with the inside surface of the tubular jacket so that the outside surface of the expanding member is moving in the same direction as the inside surface of the tubular jacket and the inside surface of the expanding member is moving in the opposite direction to its outside surface thereof.

2. A method according to claim 1, wherein the tubular jacket is a textile jacket made of fibers woven or knitted in a tubular form.

3. A method according to claim 1, wherein the coating liquid is selected from the group consisting of a rubber and a synthetic resinous material.

4. The method of claim 1, wherein the self-rotatable, endless double tubing expanding member is a natural or synthetic rubber tube which has been turned inside out from its one end to one-half of its full length with the evaginated end thereof being bonded to the other end of the tubing not yet turned inside out.

5. The method of claim 4, wherein the rubber tube is butyl rubber.

6. The method of claim 4, wherein the endless double tubing is provided with a protective anti-abrasion layer.

7. The method of claim 1, wherein the expanding member is internally pressurized to inflate it to a circular form in its cross-section.

8. The method of claim 1, wherein the expanding member is maintained in a substantially stationary position relative to the coating liquid.

9. The method of claim 1, wherein the tubular jacket is conveyed through a bath of a coating liquid and in a direction substantially perpendicular to said bath for a distance from the point where the tubular jacket leaves the bath to a point where the coating liquid attached to the external surface of the tubular jacket is no longer fluid.

10. The method of claim 1, wherein a fluid substance is introduced into the expanding member, the expanding member turning on itself due to the gravitational force of its own weight and the conveyance of the tubular jacket.

11. The method of claim 1, wherein one end portion of a cordage in the form of a continuous loop is passed around the inside and outside portion of the expanding member and the other end thereof is rotatably fixed in order to insure that the expanding member maintains a stationary position with respect to the coating liquid.

12. The method according to claim 11, wherein the tubular jacket is conveyed downward into the coating liquid bath, reversed in the upward direction by means of a reverse roll provided in the bath, and conveyed upward in substantially a perpendicular direction relative to the bath and wherein the expanding member capable of inflating the jacket to a substantially circular form in its cross section is disposed in the ascending tubular jacket and said other end of the cordage is supported in the coating liquid bath external to the jacket.

13. The method according to claim 11, wherein the tubular jacket is introduced into a tank filled with a plastisol, passed downward through a hole provided at the bottom of the tank and through a ring mounted to the hole, said ring having an inside diameter slightly larger than the outside diameter of the jacket, then conveyed through a heating zone to solidify the plastisol attached to the external surface of the jacket by gelation and then through a cooling zone where the externally coated jacket is cooled, and wherein the tubular textile jacket is inflated to a circular form in its cross section by the expanding member for at least a distance from the point where the jacket is passed through the ring to a point where the coated jacket is cooled, the expanding member being maintained in a stationary position relative to the plastisol by means of said other end of the cordage rotatably fixed in the inner space of the jacket located in the bath or outside of the bath.

14. A method according to claim 13 wherein the plastisol is polyvinyl chloride.

15. A method according to claim 13 wherein the externally coated jacket is cooled by sprinkling the surface with water or by immersing the surface in water.

16. A method according to claim 13 wherein the ring is made of a rubber or a synthetic resin.

17. A method according to claim 11, wherein a holder is used to rotatably fix the expanding member in position, said holder comprising a base plate, two side plates extending upwardly from both sides of the base plate and being fixed thereto, a first roller rotatably disposed between both side plates, a nose extending downwardly and having the shape of a wedge, and second and third rollers rotatably mounted in parallel to the first roller, and to the flat base of the nose adjacent both surfaces of the base plate, said holder being inserted into the tubular textile jacket and supported externally outside the jacket by two support rolls to permit passage of the jacket between said support rolls and the second and third rollers of the holder.

18. The method of claim 1, wherein a plurality of coating and drying steps are utilized, and said flexible self-rotatable, endless double tubing and a plurality of granules capable of inflating the jacket to a substantially circular cross-sectional shape are alternately used as the expanding member in the repeated coating and drying steps.

19. The method according to claim 18, wherein the self-rotatable endless double tubing is used in the initial coating step and a plurality of metal balls are used in the remaining coating operations.

20. The method according to claim 1, wherein the inflated tubular jacket is passed, prior to the coating treatment, through a bath of a clogging liquid having good compatibility with the coating liquid and possessing a viscosity of about 5,000–20,000 cp and then through a scraper to remove any excess amount of the clogging liquid attached to the external surface of the jacket while pushing the remaining clogging liquid into the voids of the texture and, the clogging liquid in the voids is solidified.

21. The method according to claim 20, wherein a ring made of a stiff material is used as the scraper and wherein the self-rotatable endless double tubing expanding member is inserted into the tubular jacket and maintained in a definite position to the clogging liquid, thereby maintaining the jacket with a circular cross section on passing through the ring.

22. In a method of forming a coating having a uniform thickness on the external surface of a tubular jacket wherein the tubular jacket is conveyed through a coating liquid bath and drying zone and maintained in a substantially circular cross-sectional shape at least for a distance from the point where the coating is applied to the tubular jacket to a point where the coating attached to the external surface of the tubular jacket solidifies, the improvement which comprises inserting into the inner space of the tubular jacket a plurality of granules capable of inflating the jacket to a substantially circular cross-sectional shape said individual granules rotating and changing positions within the bulk of granules disposed within the tubular jacket as a result of being in frictional contact with each other and with the traveling inside surface of the tubular jacket and due to the weight of the granules.

23. The method according to claim 22 wherein the tubular jacket containing a large number of granules is pressed while in the coating liquid bath so as to inflate any half-flattened portion of the jacket to a circular form in its cross section.

* * * * *